(12) United States Patent
Kim

(10) Patent No.: US 11,679,808 B2
(45) Date of Patent: Jun. 20, 2023

(54) FRONT BODY REINFORCEMENT STRUCTURE

(71) Applicants: HYUNDAI MOTOR COMPANY, Seoul (KR); KIA CORPORATION, Seoul (KR)

(72) Inventor: Eonpyo Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 123 days.

(21) Appl. No.: 17/232,446

(22) Filed: Apr. 16, 2021

(65) Prior Publication Data

US 2022/0194474 A1 Jun. 23, 2022

(30) Foreign Application Priority Data

Dec. 22, 2020 (KR) .................. 10-2020-0180559

(51) Int. Cl.
| | |
|---|---|
| *B62D 21/15* | (2006.01) |
| *B62D 21/11* | (2006.01) |
| *B62D 25/08* | (2006.01) |
| *B62D 25/14* | (2006.01) |
| *B62D 25/04* | (2006.01) |
| *B62D 27/02* | (2006.01) |

(52) U.S. Cl.
CPC ............ *B62D 21/152* (2013.01); *B62D 21/11* (2013.01); *B62D 25/08* (2013.01); *B62D 25/14* (2013.01); *B60Y 2306/01* (2013.01); *B62D 21/15* (2013.01); *B62D 25/04* (2013.01); *B62D 27/023* (2013.01)

(58) Field of Classification Search
CPC ...... B62D 21/152; B62D 21/11; B62D 25/08; B62D 25/14; B62D 25/04; B62D 27/023; B62D 21/15; B60Y 2306/01
USPC .................................................... 296/187.09
See application file for complete search history.

(56) References Cited

U.S. PATENT DOCUMENTS 8,596,711 B2 * 12/2013 Yasui .................. B62D 25/082
296/187.1
2017/0210425 A1 * 7/2017 Sekiguchi ............. B62D 25/08

\* cited by examiner

*Primary Examiner* — Joseph D. Pape
*Assistant Examiner* — Dana D Ivey
(74) *Attorney, Agent, or Firm* — Lempia Summerfield Katz LLC

(57) ABSTRACT

A front body reinforcement structure for a vehicle includes: a front side member connected to a dash panel; a front pillar which is disposed in a height direction of a vehicle body and has a lower part connected to the front side member; a front side upper member connecting a front of the front side member and an upper part of the front pillar; and a reinforcement unit that is connected with the dash panel and connects a rear of the front side member and an upper portion of the front pillar.

13 Claims, 10 Drawing Sheets

FRONT BODY REINFORCEMENT STRUCTURE

CROSS-REFERENCE TO RELATED APPLICATION

This application claims priority to and the benefit of Korean Patent Application No. 10-2020-0180559, filed on Dec. 22, 2020, the entire contents of which are incorporated herein by reference.

FIELD

The present disclosure relates to a front body reinforcement structure. More particularly, the present disclosure relates to a front body reinforcement structure capable of appropriately distributing a collision load in the event of a vehicle collision.

BACKGROUND

The statements in this section merely provide background information related to the present disclosure and may not constitute prior art.

In general, in the case of a vehicle's forward collision, the impact load is distributed approximately 30% to the front subframe, approximately 50% to the front side member, and approximately 20% to the front side upper member.

That is, in the case of a general vehicle's forward collision, the load path structure may be a 3-way multi-load path structure, and the main collision load is transmitted through the front side member.

A typical internal combustion engine vehicle may cope with forward collision performance through the 3-way multi-load pass structure, however we have discovered that a dedicated electric vehicle with a weight heavier than about 200 kg has a limitation in coping with forward collision through the existing multi-load pass structure. In particular, in the case of the front side member that bears 50% of the impact load, the same size with 'U' cross-section is maintained from the front to the dash panel. But, the section connected from the dash panel to the side sill through the rear lower member gradually widens and the section rigidity decreases, resulting in deterioration in impact performance and vehicle body rigidity.

The above information disclosed in this Background section is only for enhancement of understanding of the background of the present disclosure, and therefore it may contain information that does not form the prior art that is already known to a person of ordinary skill in the art.

SUMMARY

The present disclosure provides a front body reinforcement structure capable of properly distributing the impact load in case of a vehicle front collision.

According to an exemplary form of the present disclosure, a front body reinforcement structure may include: a front side member connected to a dash panel, a front pillar disposed in height direction of a vehicle body and including a lower part connected to the front side member, a front side upper member connecting a front of the front side member and an upper part of the front pillar, and a reinforcement unit that is connected with the dash panel and connects a rear part of the front side member and an upper portion of the front pillar.

The front part of the front side member, the front side upper member and the reinforcement unit may form a first connection structure with a rhombus shape, and the rear part of the front side member, the reinforcement unit and the front pillar may form a second connection structure with a rhombus shape.

The reinforcement unit may include a reinforcement body portion protrude in the front direction of the vehicle body, a reinforcement side portion bent from the reinforcement body portion, and a reinforcement flange portion bent at the reinforcement side portion and joined to the dash panel.

In another form, the front body reinforcement structure may further include a front shock absorber housing panel connected to the front side member, and the rear end of the front shock absorber housing panel may be joined to the reinforcement body portion.

The front side member may include a front side member side surface being bent at the front side member upper surface, and the front side member upper surface may be connected to the reinforcement body portion, and the front side member side surface is connected to the reinforcement side portion.

The front side member upper surface may include an end surface whose one end is curved, and the end surface may be connected to the reinforcement body portion.

The reinforcement unit may include an upper body and a lower body, and the upper body and the lower body may be overlapped and connected, and the overlapped part may support the front side member upper surface.

The front body reinforcement structure according to an exemplary form of the present disclosure may further include a bulk head provided inside the reinforcement unit supporting the front side member upper surface.

The reinforcement unit may further include an upper reinforcement flange portion formed to be bent to join the upper part of the front pillar.

The front body reinforcement structure according to an exemplary form of the present disclosure may further include a front side member inner rear gusset provided at the rear of the reinforcement unit, and a notch may be formed in the reinforcement unit to support the front side member inner rear gusset.

A strength bead may be formed in the reinforcement unit.

An electro deposition drain bead may be formed at the bottom of the reinforcement unit.

An electro deposition drain hole may be formed in the lower part of the reinforcement unit.

A connection portion between the front pillar and the reinforcement unit may be formed lower than a connection portion between the front side upper member and the front pillar.

According to the front body reinforcement structure according to an exemplary form of the present disclosure, collision load may be effectively absorbed by distributing the collision load path transmitted to the vehicle body into three routes when the vehicle is in a frontal collision.

According to the front body reinforcement structure according to an exemplary form of the present disclosure, it is possible to prevent the front side member from being bent and lifting the vehicle body in the upper direction by providing a reinforcement unit.

According to the front body reinforcement structure according to an exemplary form of the present disclosure, it is possible to prevent the front side member from penetrating into the dash panel during a frontal collision of the vehicle by the reinforcement unit.

According to the front body reinforcement structure according to an exemplary form of the present disclosure, in the case of a small overlap collision, the tire may first contact the reinforcement unit before directly contacting the A pillar to absorb the collision load.

According to the front body reinforcement structure according to an exemplary form of the present disclosure, the reinforcement unit blocks water that may be transmitted through the tire from the road surface during rainy weather, thereby improving water-tightness and drainage performance.

In addition, effects that can be obtained or predicted by the forms of the present disclosure will be disclosed directly or implicitly in the detailed description of the forms of the present disclosure. That is, various effects predicted according to one form of the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
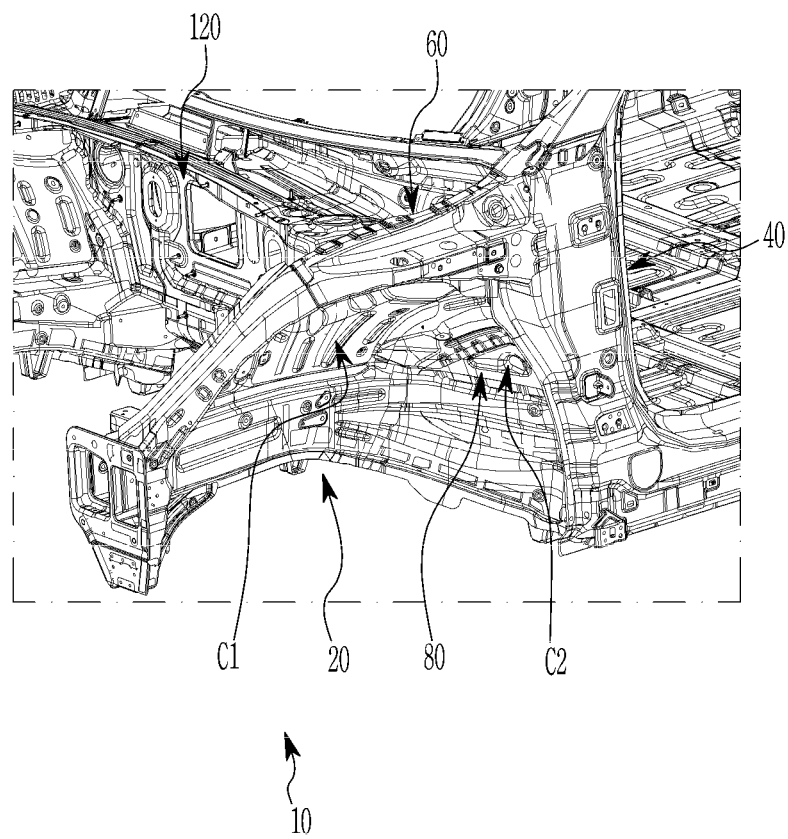
FIG. 1 is a perspective drawing viewed from an outside of a vehicle body of a front body reinforcement structure according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure.

Parts indicated by the same reference numerals throughout the specification mean the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

An exemplary form of the present disclosure will hereinafter be described in detail with reference to the accompanying drawings.

FIG. 1 is a perspective drawing viewed from an outside of a vehicle body of a front body reinforcement structure according to an exemplary form of the present disclosure.

Referring to FIG. 1, a front body reinforcement structure according to an exemplary form of the present disclosure may include: a front side member 20 connected to a dash panel 120, a front pillar 40 disposed in height direction of a vehicle body, and of which a lower part thereof is connected to the front side member 20, a front side upper member 60 connecting a front of the front side member 20 and an upper part of the front pillar 40, and a reinforcement unit 80 that is connected with the dash panel 120 and connects a rear of the front side member 20 and an upper portion of the front pillar 40.

The front part of the front side member 20, the front side upper member 60 and the reinforcement unit 80 may form a first connection structure C1 with a rhombus shape, and the rear part of the front side member 20, the reinforcement unit 80 and the front pillar 40 may form a second connection structure C2 with a rhombus shape.

When the vehicle body 10 collides in the front, a part of the impact load is transmitted to the rear of the vehicle body 10 through the front part of the front side member 20 and the front side upper member 60. And the other part of the impact load is transmitted to the rear of the vehicle body 10 through the front side member 20 and the reinforcement unit 80. Therefore, when the vehicle body 10 collides forward, the impact load may be distributed and transmitted to the rear of the vehicle body 10.

Figure 2:
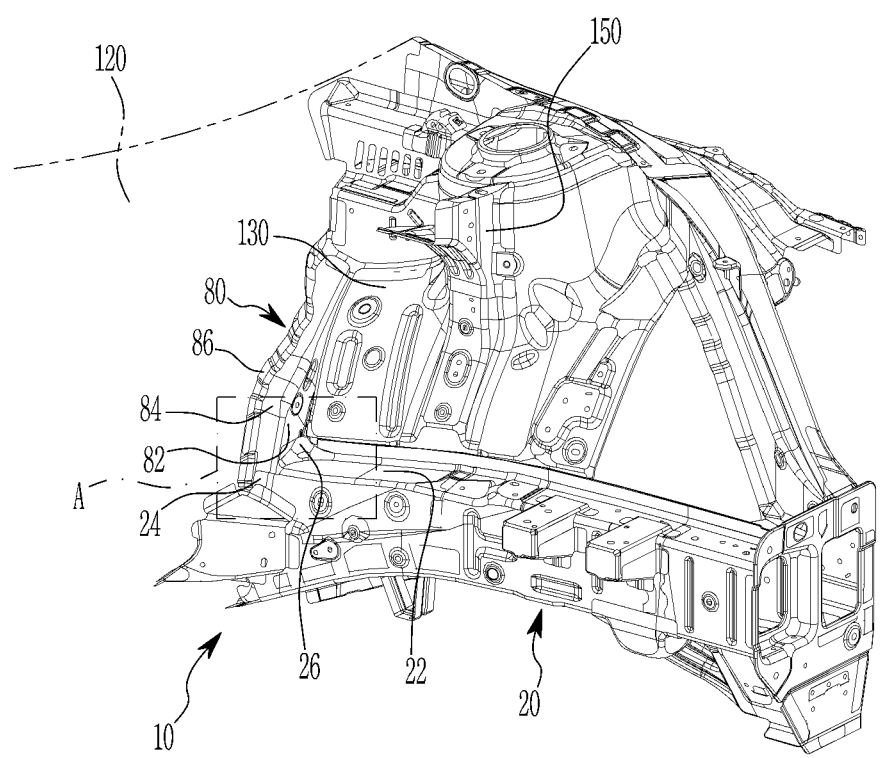
FIG. 2 is a perspective drawing viewed from an inside of a vehicle body of a front body reinforcement structure according to an exemplary form of the present disclosure.
Figure 3:
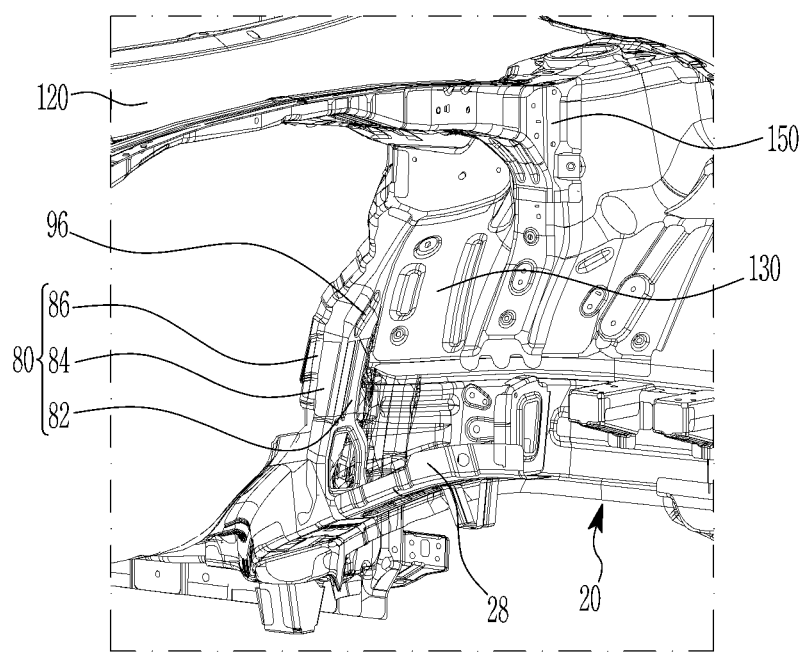
FIG. 3 is a partial perspective drawing viewed from an inside of a vehicle body of a front body reinforcement structure according to an exemplary form of the present disclosure.
Figure 4:
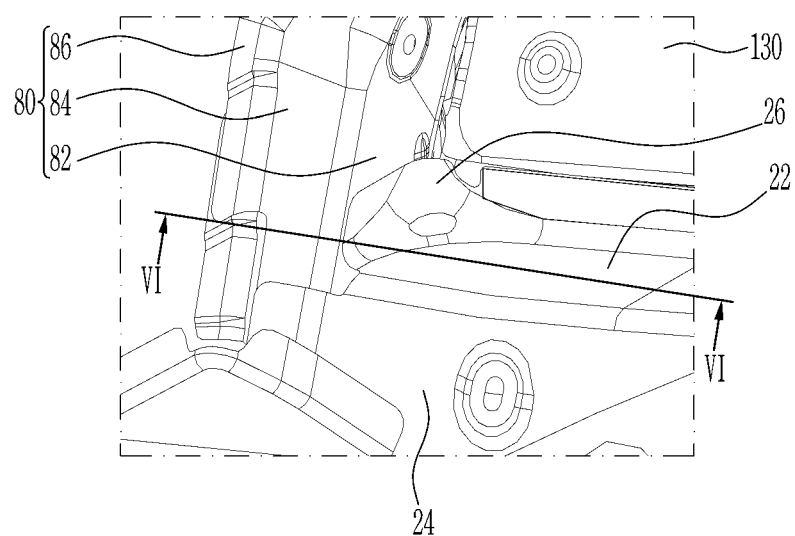
FIG. 4 is an enlarged view of part A in FIG. 2.

FIG. 2 is a perspective drawing viewed from an inside of a vehicle body of a front body reinforcement structure according to an exemplary form of the present disclosure, FIG. 3 is a partial perspective drawing viewed from an inside of a vehicle body of a front body reinforcement structure according to an exemplary form of the present disclosure, and FIG. 4 is an enlarged view of part A in FIG. 2.

Referring to FIG. 1 to FIG. 4, the reinforcement unit 80 may include: a reinforcement body portion 82 protruding in the front direction of the vehicle body 10, a reinforcement side portion 84 bent from the reinforcement body portion 82, and a reinforcement flange portion 86 bent at the reinforcement side portion 84 and joined to the dash panel. The strength of the reinforcement unit 80 may be secured by the curved shape of the reinforcement body portion 82 and the reinforcement side portion 84. In addition, the reinforcement flange portion 86 is coupled by surface contact with the dash panel 120, and in the event of a vehicle collision, the dash panel 120 is inhibited or prevented from being damaged by the reinforcing part 80, thereby preventing injury to a passenger.

The front body reinforcement structure according to an exemplary form of the present disclosure further includes a front shock absorber housing panel 130 connected to the front side member 20, and the rear end of the front shock absorber housing panel 130 may be connected to the reinforcement body portion 82. One end of the front shock absorber housing panel 130 is connected to the reinforcement body portion 82, thus, it is possible to inhibit or prevent the front shock absorber housing panel 130 from damaging the interior of the vehicle body 10, for example, the dash panel 120 during a vehicle collision. And a front shock absorber housing front support 150 is provided to support the front shock absorber housing panel 130.

The front side member 20 includes a front side member upper surface 22 and a front side member side surface 24 bent at the front side member upper surface 22. The front side member upper surface 22 may be joined to the reinforcement body portion 82, and the front side member side surface 24 may be joined to the reinforcement side portion 84. The front side member upper surface 22 is bonded to the reinforcement body portion 82. Thus, in the event of a vehicle collision, the front side member 20 may prevent the dash panel 120 from being damaged, thereby suppressing the possibility of injury to the passenger.

The front side member upper surface 22 includes an end surface 26 whose one end is curved, and the end surface 26 may be connected to the reinforcement body portion 82. That is, the end surface 26 bent from the front side member upper surface 22 supports the reinforcement body portion 82 to prevent the front side member 20 from damaging the dash panel 120 in the event of a vehicle collision, thereby reducing the possibility of occupant injury.

Inside the front side member 20, a front side member inner front reinforcement 28 is provided to increase the strength of the front side member 20, and the front side member inner front reinforcement 28 may be supported by the reinforcement unit 80.

Figure 5:
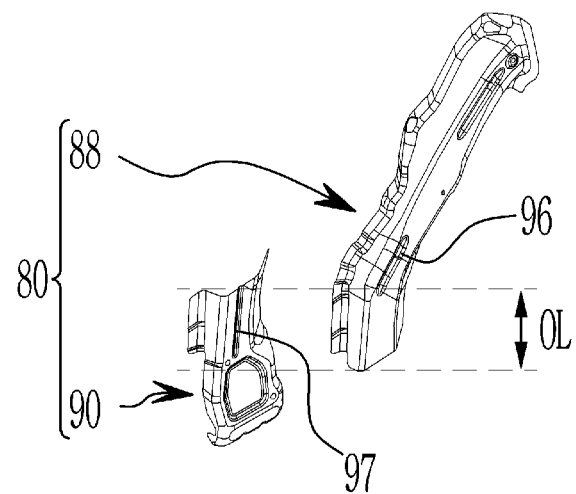
FIG. 5 is an exploded perspective view of a reinforcement unit that may be applied to a front body reinforcement structure according to an exemplary form of the present disclosure.
Figure 6:
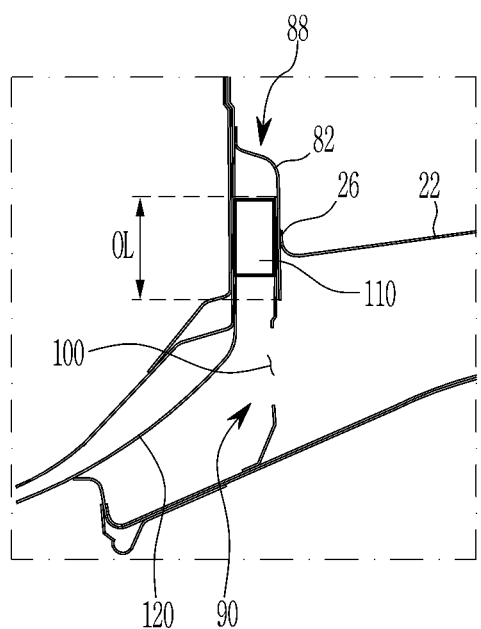
FIG. 6 is a cross-sectional view along the line VI-VI in FIG. 4.

FIG. 5 is an exploded perspective view of a reinforcement unit that may be applied to a front body reinforcement structure according to an exemplary form of the present disclosure and FIG. 6 is a cross-sectional view along the line VI-VI in FIG. 4.

Referring to FIG. 5 and FIG. 6, the reinforcement unit 80 includes an upper body 88 and lower body 90, and the upper body 88 and the lower body 90 are overlapped and combined, and the overlapped portion OL may support the front side member upper surface 22. The reinforcement unit 80 supports the part adjacent to the front side member upper surface 22 with the overlapped portion OL to inhibit or prevent the front side member 20 from breaking the dash panel 120 passing the reinforcement unit 80 in the event of a vehicle collision. And, through this, the possibility of causing injury to the occupant may be suppressed.

The front body reinforcement structure according to an exemplary form of the present disclosure may further include a bulk head 110 provided inside the reinforcement unit 80 supporting the front side member upper surface 22. The bulk head 110 also supports the part adjacent to the front side member upper surface 22, preventing the front side member 20 from breaking the dash panel 120 passing the reinforcement unit 80 in the event of a vehicle collision. Therefore, it is possible to suppress the possibility of causing injury to the occupant.

The front body reinforcement structure according to an exemplary form of the present disclosure may include both the overlapped portion OL and the bulk head 110, or may include any one of the overlapped portion OL or the bulk head 110.

Figure 7:
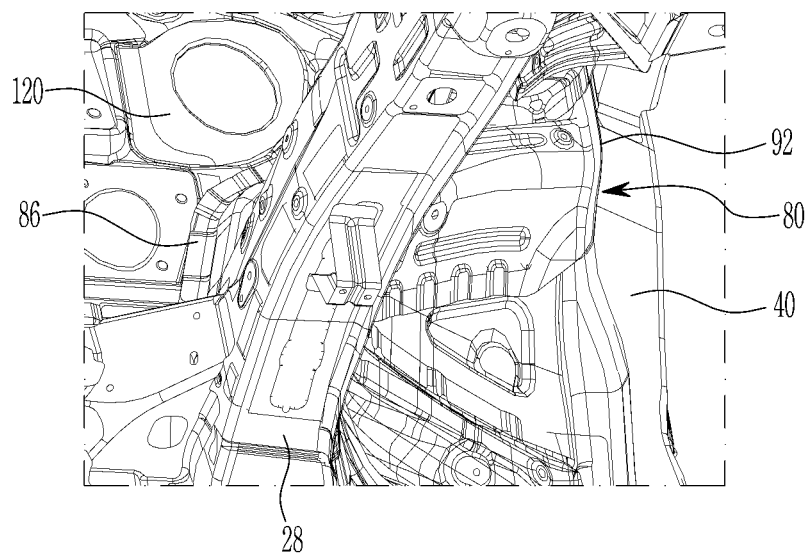
FIG. 7 is a perspective drawing viewed from a lower side of the vehicle body of a front body reinforcement structure according to an exemplary form of the present disclosure.

FIG. 7 is a perspective drawing viewed from a lower side of the vehicle body of a front body reinforcement structure according to an exemplary form of the present disclosure.

The reinforcement unit 80 may further include an upper reinforcement flange portion 92 that is bent to be connected to the upper part of the front pillar 40. The upper reinforcement flange portion 92 is combined with the front pillar 40 to secure the connection strength with the front pillar 40.

Figure 8:
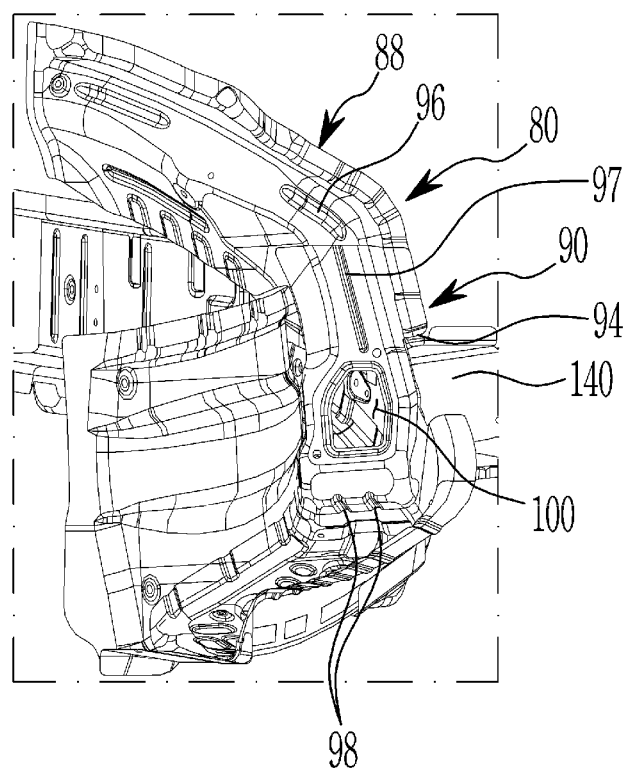
FIG. 8 is a partial perspective view of a reinforcement unit that may be applied to a front body reinforcement structure according to an exemplary form of the present disclosure.

FIG. 8 is a partial perspective view of a reinforcement unit that may be applied to a front body reinforcement structure according to an exemplary form of the present disclosure.

The front body reinforcement structure according to an exemplary form of the present disclosure further includes a front side member inner rear gusset 140 provided at the rear of the reinforcement unit 80, and a notch 94 is formed in the reinforcement unit 80 so as to support the front side member inner rear gusset 140. Welding work may be interfered with by the shape of the front side member inner rear gusset 140, or welding may not be possible due to the formation of a closed section, but the notch 94 supports the front side member inner rear gusset 140 to secure strength.

Strength beads 96, and 97 may be formed in the reinforcement unit 80. That is, as shown in FIG. 5 and FIG. 8, the upper body 88 and the lower body 90 have strength beads 96, and 97, respectively, to increase the strength of the reinforcement unit 80.

An electro deposition drain bead 98 may be formed at the bottom of the reinforcement unit 80. Through the drain bead 98, the electro-deposition liquid may be exhausted without accumulating.

An electro deposition drain hole 100 may be formed under the reinforcement unit 80. The electro-deposition drain hole 100 suppresses coating defects of electro-deposition solution and provides smooth flow of electro-deposition solution to suppress coating defects.

Figure 9:
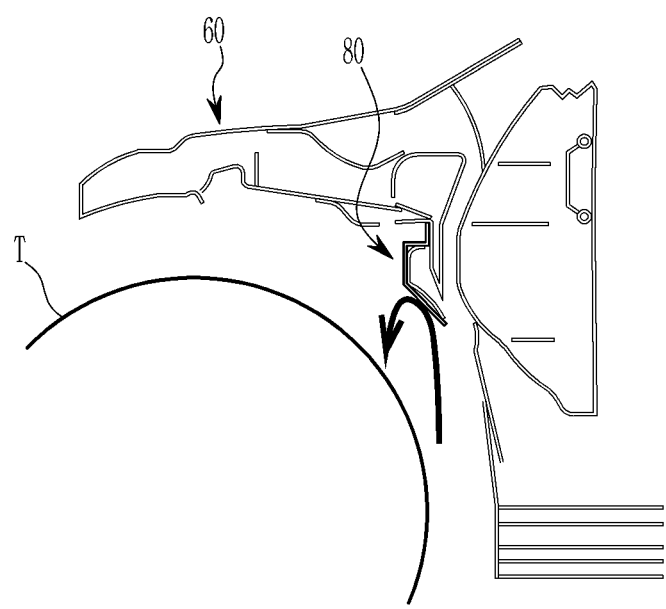
FIG. 9 is a side cross-sectional view of a front body reinforcement structure according to an exemplary form of the present disclosure.

FIG. 9 is a side cross-sectional view of a front body reinforcement structure according to an exemplary form of the present disclosure.

Referring to FIG. 9, the lower part of the reinforcement unit 80 may be inclined along a direction from the front to the rear of the vehicle body 10. In rainy weather, water, etc., may splash from a tire "T" and inflow into the vehicle body 10, but the inflow of this material may be blocked by the lower shape of the reinforcement unit 80.

Figure 10:
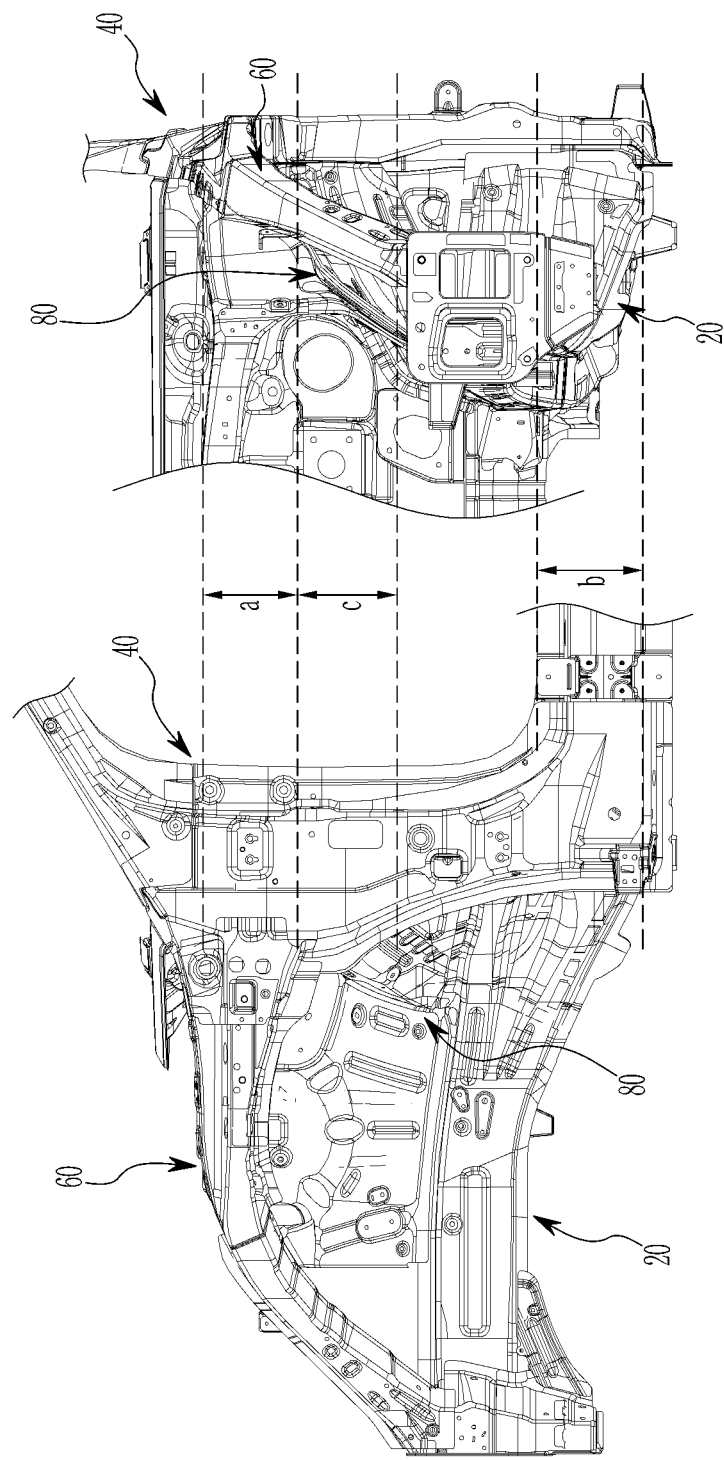
FIG. 10 is a comparative drawing of the side and front cross-section view of a front body reinforcement structure according to an exemplary form of the present disclosure.

FIG. 10 is a comparative drawing of the side and front cross-section view of a front body reinforcement structure according to an exemplary form of the present disclosure.

Referring to FIG. 10, a connection portion between the front pillar 40 and the reinforcement unit 80 is formed lower than a connection portion between the front side upper member 60 and the front pillar 40.

In the front body reinforcement structure according to an exemplary form of the present disclosure, the part (a) where the front side upper member 60 and the front pillar 40 are combined and the part (b) where the front side member 20 and the front pillar 40 are combined together with the part (c) where the reinforcement unit 80 and the front pillar 40 are combined is added, allowing various distribution of the impact load in the event of a vehicle's forward impact, so that the impact load may be properly distributed.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

- 10: vehicle body
- 20: front side member
- 22: front side member upper surface
- 24: front side member side surface
- 26: end surface
- 28: front side member inner front reinforcement
- 40: front pillar
- 60: front side upper member
- 80: reinforcement unit
- 82: reinforcement body portion
- 84: reinforcement side portion
- 86: reinforcement flange portion
- 88: upper body
- 90: lower body
- 92 upper reinforcement flange portion
- 94: notch
- 96, 97: strength bead
- 98: electro deposition drain bead
- 100: electro deposition drain hole
- 110: bulk head
- 120: dash panel
- 130: front shock absorber housing panel
- 140: front side member inner rear gusset
- 150: front shock absorber housing front support
- C1, C2: first/second connection structure
- OL: overlap portion

What is claimed is:

1. A front body reinforcement structure of a vehicle, comprising:
   a front side member connected to a dash panel;
   a front pillar disposed in height direction of a vehicle body, and including a lower part connected to the front side member;
   a front side upper member configured to connect a front part of the front side member and an upper part of the front pillar; and
   a reinforcement unit connected with the dash panel and configured to connect a rear part of the front side member and an upper portion of the front pillar,
   wherein an electro deposition drain hole is formed in a lower part of the reinforcement unit.

2. The front body reinforcement structure of claim 1, wherein:
   the front part of the front side member, the front side upper member and the reinforcement unit are configured to form a first connection structure with a rhombus shape, and
   the rear part of the front side member, the reinforcement unit and the front pillar are configured to form a second connection structure with a rhombus shape.

3. The front body reinforcement structure of claim 1, wherein the reinforcement unit comprises:
   a reinforcement body portion is configured to protrude in a front direction of the vehicle body;
   a reinforcement side portion is configured to be bent from the reinforcement body portion; and
   a reinforcement flange portion is configured to be bent at the reinforcement side portion and joined to the dash panel.

4. The front body reinforcement structure of claim 3, further comprising a front shock absorber housing panel connected to the front side member,
   wherein a rear end of the front shock absorber housing panel is joined to the reinforcement body portion.

5. The front body reinforcement structure of claim 3, wherein the front side member further includes a front side member side surface configured to be bent at a front side member upper surface,
   wherein the front side member upper surface is connected to the reinforcement body portion, and the front side member side surface is connected to the reinforcement side portion.

6. The front body reinforcement structure of claim 5, wherein the front side member upper surface includes an end surface having a curved end,
   wherein the end surface is connected to the reinforcement body portion.

7. The front body reinforcement structure of claim 5, wherein the reinforcement unit includes an upper body and a lower body,
   wherein the upper body and the lower body are overlapped and connected, and the overlapped part is configured to support the front side member upper surface.

8. The front body reinforcement structure of claim 5, further comprising a bulk head provided inside the reinforcement unit configured to support the front side member upper surface.

9. The front body reinforcement structure of claim 3, wherein the reinforcement unit further includes an upper reinforcement flange portion formed to be bent to join the upper portion of the front pillar.

10. The front body reinforcement structure of claim 3, further comprising a front side member inner rear gusset provided at a rear part of the reinforcement unit,
    wherein a notch is formed in the reinforcement unit to support the front side member inner rear gusset.

11. The front body reinforcement structure of claim 3, wherein a strength bead is formed in the reinforcement unit.

12. The front body reinforcement structure of claim 3, wherein an electro deposition drain bead is formed at a bottom of the reinforcement unit.

13. The front body reinforcement structure of claim 1, wherein a connection portion between the front pillar and the reinforcement unit is formed lower than a connection portion between the front side upper member and the front pillar.

* * * * *